(12) United States Patent
Arroum et al.

(10) Patent No.: US 11,401,037 B2
(45) Date of Patent: Aug. 2, 2022

(54) SEAT HAVING AN AUXILIARY TABLET

(71) Applicant: Safran Seats, Plaisir (FR)

(72) Inventors: Houssem Arroum, Soliman (TN);
Raouia Akkari, Soliman (TN)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/288,876

(22) PCT Filed: Oct. 31, 2019

(86) PCT No.: PCT/EP2019/079897
§ 371 (c)(1),
(2) Date: Apr. 26, 2021

(87) PCT Pub. No.: WO2020/089423
PCT Pub. Date: May 7, 2020

(65) Prior Publication Data
US 2021/0347486 A1  Nov. 11, 2021

Related U.S. Application Data

(60) Provisional application No. 62/754,267, filed on Nov. 1, 2018.

(51) Int. Cl.
*B64D 11/06* (2006.01)
(52) U.S. Cl.
CPC .................. *B64D 11/0638* (2014.12)
(58) Field of Classification Search
CPC ....... B64D 11/0638; B60N 3/004; A47C 7/68; A47C 7/70
(Continued)

(56) References Cited

U.S. PATENT DOCUMENTS 1,034,678 A * 8/1912 berger et al. ........ B60N 2/3084
297/112
4,519,648 A * 5/1985 Jovanovic .............. B60N 3/004
297/146
(Continued)

FOREIGN PATENT DOCUMENTS

DE    3942629 A1    6/1991
EP    2930108 A1    10/2015
(Continued)

OTHER PUBLICATIONS

International Patent Application No. PCT/EP2019/079897, International Search Report (and English translation) and Written Opinion, dated Feb. 21, 2020.

*Primary Examiner* — Jose V Chen
(74) *Attorney, Agent, or Firm* — Kilpatrick Townsend & Stockton LLP

(57) ABSTRACT

The present invention relates to an assembly, in particular for an aircraft, comprising
a seat back,
a main tablet mounted on the seat back via a tablet structure, said main tablet being movable between a stored position, in which the tablet is pressed against a rear face of the seat back, and a deployed position,
said assembly further comprising an auxiliary tablet mounted on the tablet structure via at least one auxiliary arm, said auxiliary tablet being movable between a raised position and a deployed position, in which the auxiliary tablet is vertically superposed with respect to the main tablet.

9 Claims, 4 Drawing Sheets

(58) Field of Classification Search
USPC .......................................................... 297/146
See application file for complete search history.

(56) References Cited

U.S. PATENT DOCUMENTS

| | | | | |
|---|---|---|---|---|
| 4,726,621 | A * | 2/1988 | Muller | B61D 33/00 |
| | | | | 297/146 |
| 4,836,602 | A * | 6/1989 | d'Almada Remedios | |
| | | | | B64D 11/0007 |
| | | | | 297/146 |
| 5,695,240 | A * | 12/1997 | Luria | B60N 3/004 |
| | | | | 297/163 |
| 6,494,533 | B1 * | 12/2002 | Bohler | B60N 3/004 |
| | | | | 297/146 |
| 7,306,282 | B2 * | 12/2007 | Salzer | A47C 7/70 |
| | | | | 297/146 |
| 7,658,153 | B1 * | 2/2010 | Patoka | B60R 11/00 |
| | | | | 108/44 |
| 8,814,245 | B1 * | 8/2014 | Welch | B60R 7/02 |
| | | | | 296/37.16 |
| 8,934,063 | B2 * | 1/2015 | Boyer, Jr. | B64D 11/00153 |
| | | | | 348/837 |
| 2008/0121774 | A1 * | 5/2008 | Johnson | A47B 23/02 |
| | | | | 248/311.2 |
| 2019/0283881 | A1 * | 9/2019 | Colletti | B60N 3/004 |

FOREIGN PATENT DOCUMENTS

| | | | | |
|---|---|---|---|---|
| EP | 3666650 | A1 * | 6/2020 | ....... B64D 11/00152 |
| FR | 2737447 | A1 * | 2/1997 | ............. B60N 3/004 |
| WO | 8701998 | A1 | 4/1987 | |
| WO | WO-9109778 | A1 * | 7/1991 | ............. B60N 3/001 |
| WO | WO-2015013661 | A1 * | 1/2015 | ......... B60R 11/0252 |
| WO | WO-2018057117 | A1 * | 3/2018 | ......... B60R 11/0235 |
| WO | WO-2020068064 | A1 * | 4/2020 | ......... B64D 11/0638 |

\* cited by examiner

[Fig. 1]
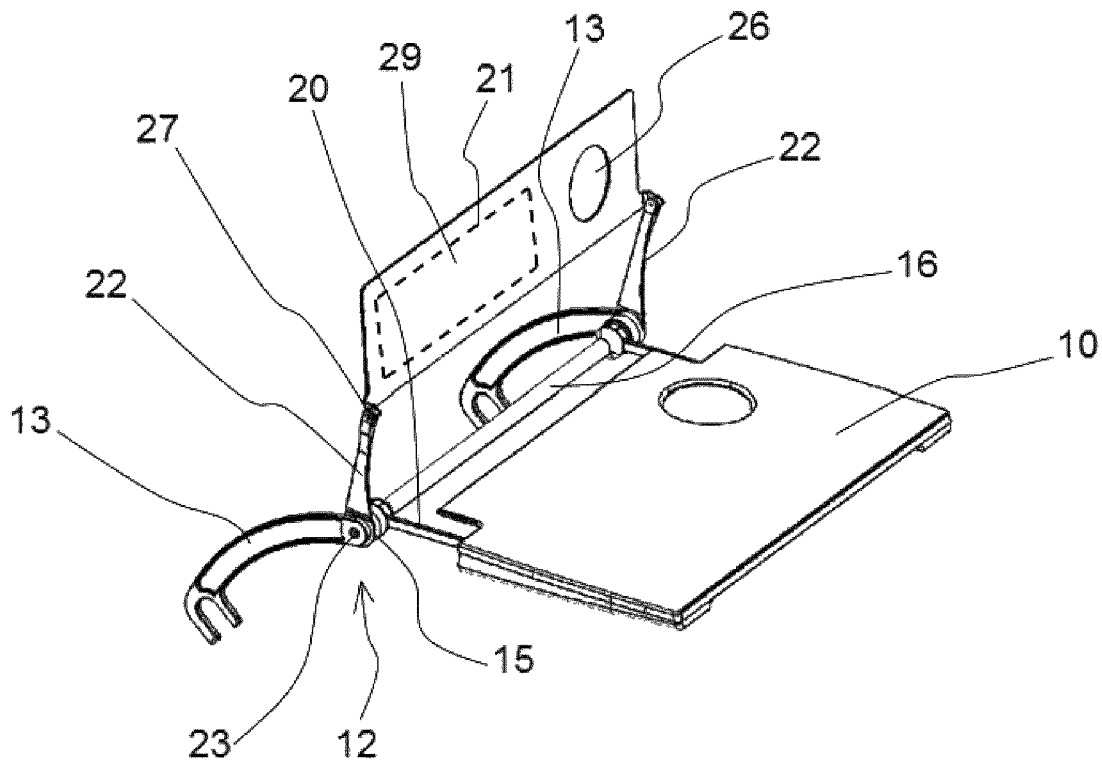
[Fig. 2]
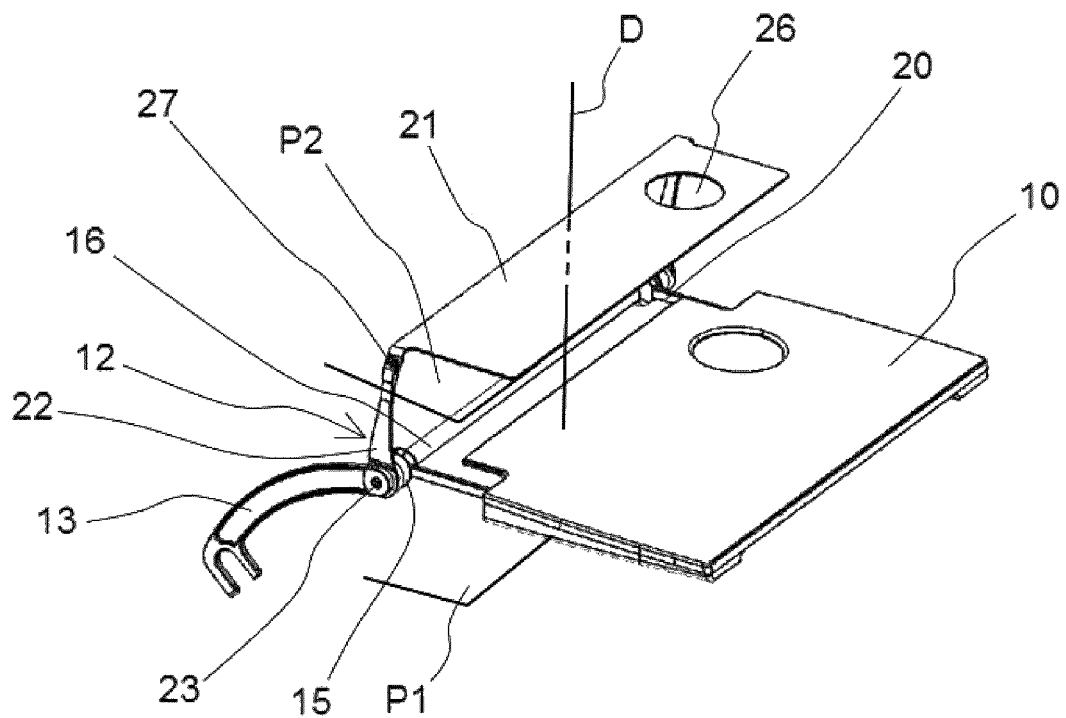

[Fig. 3]
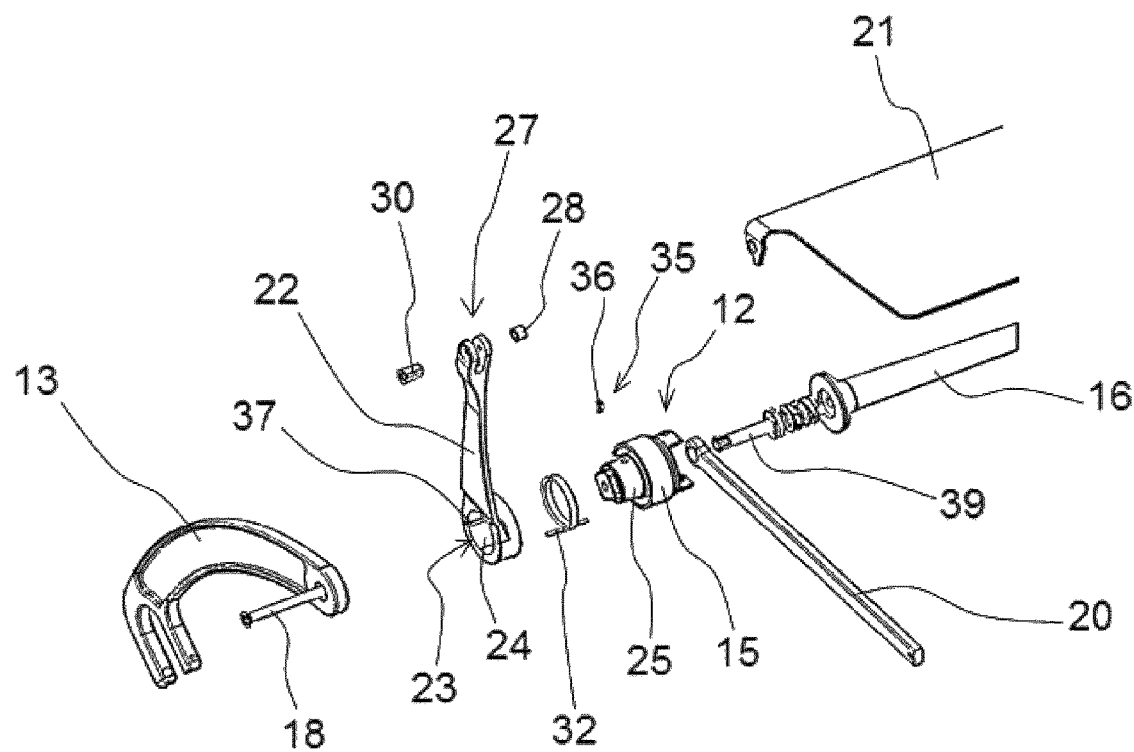
[Fig. 4]
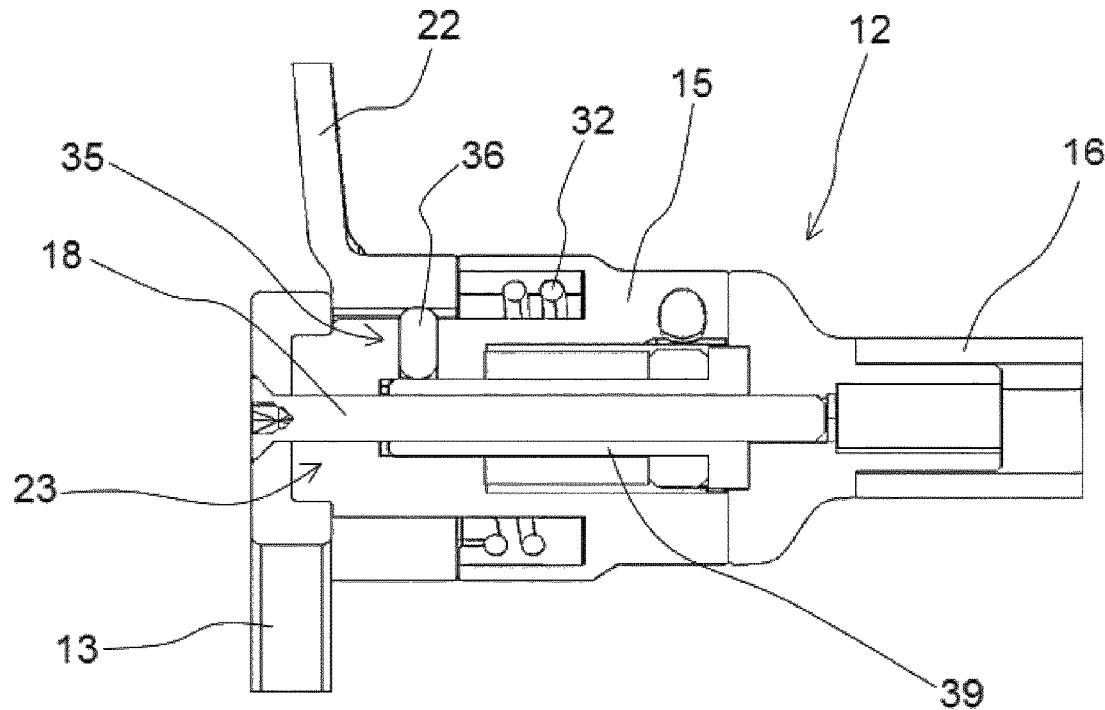

[Fig. 5a]
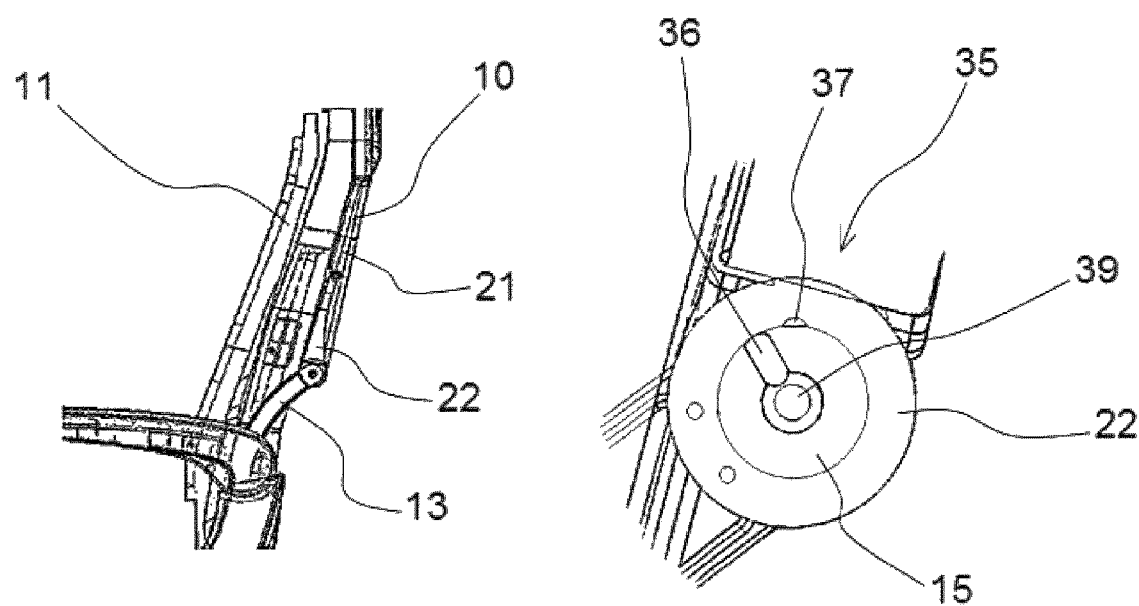
[Fig. 5b]
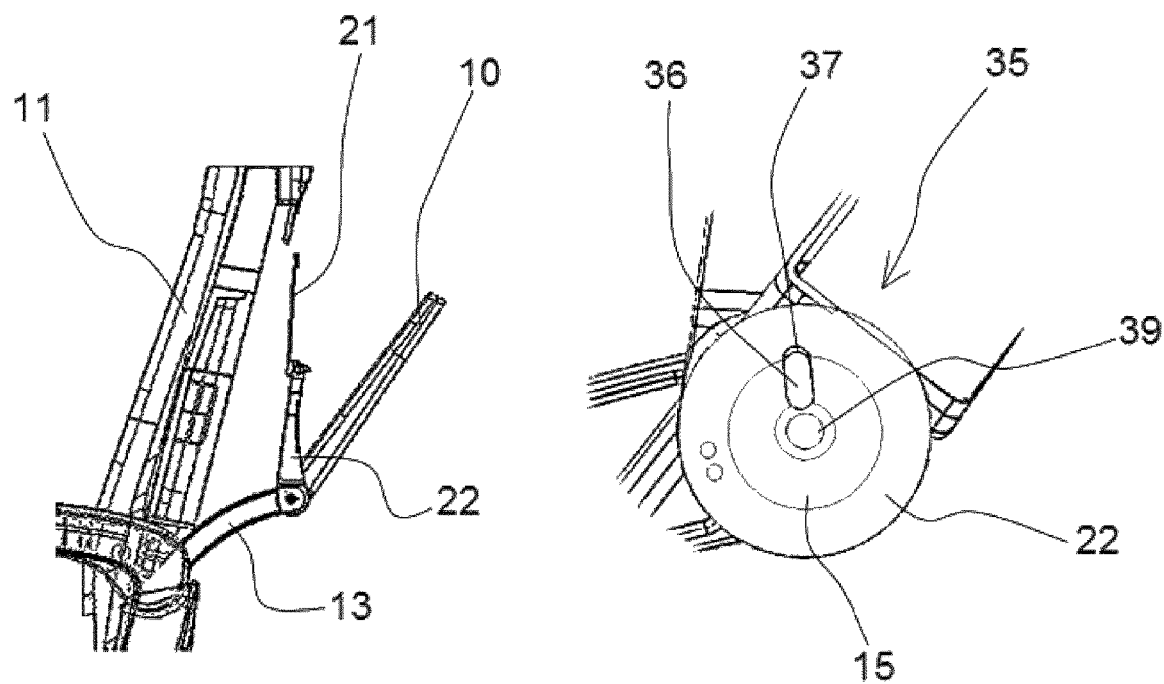

[Fig. 5c]
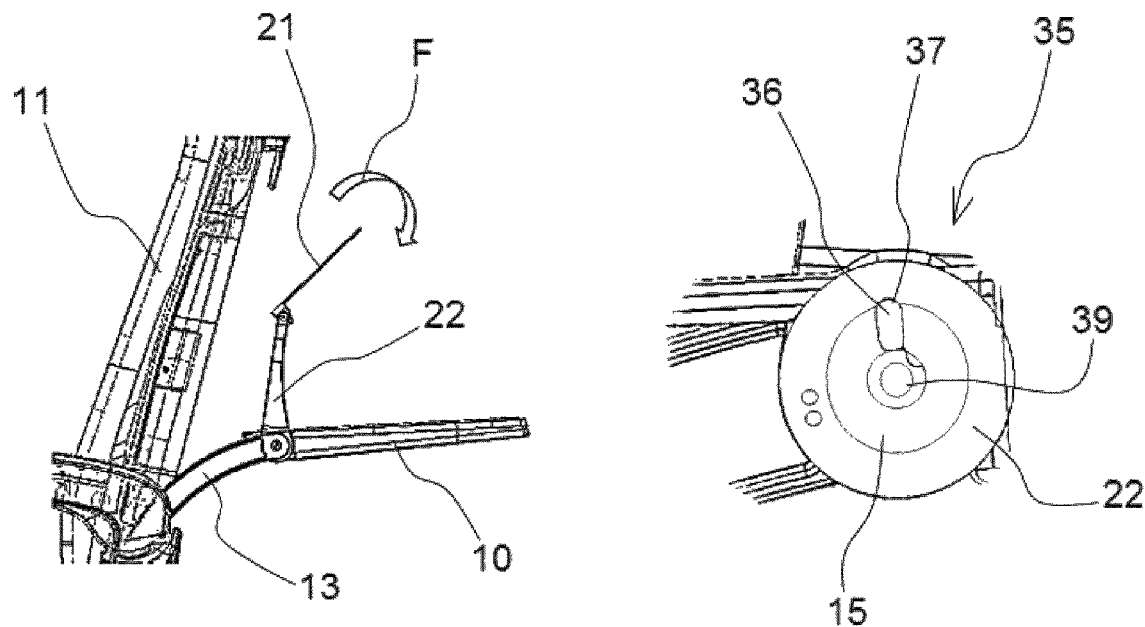
[Fig. 5d]
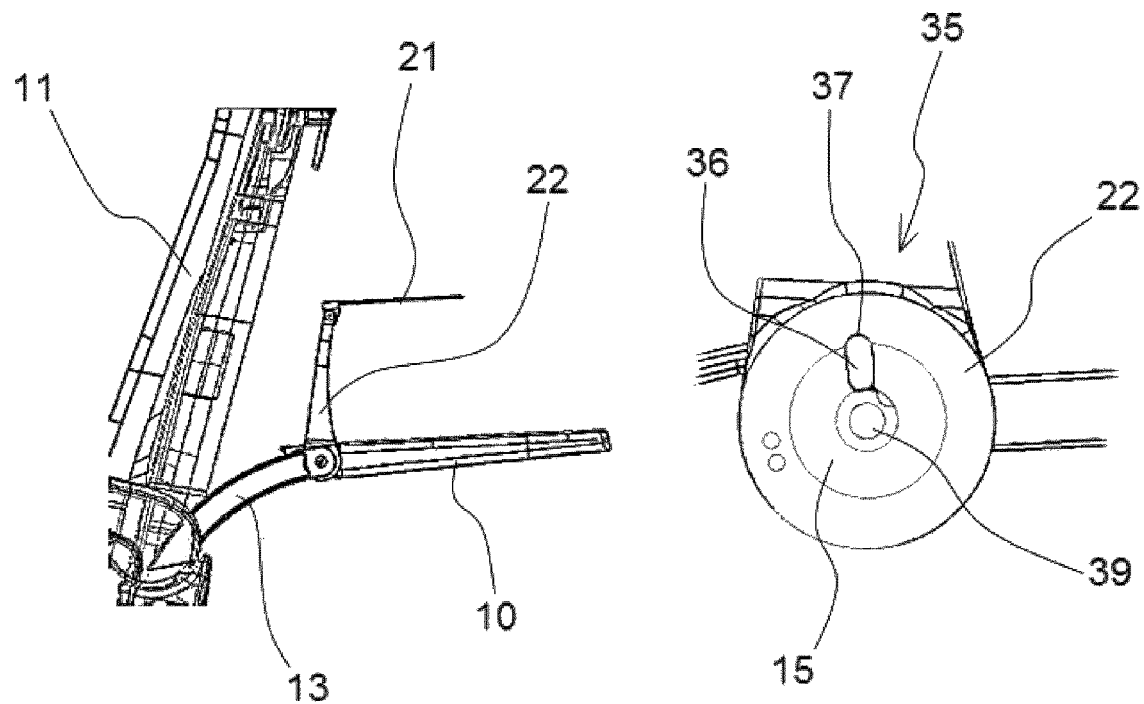

ically horizontal plane to allow a passenger to place objects on the upper face of the tray table.

SEAT HAVING AN AUXILIARY TABLET

CROSS-REFERENCE TO RELATED APPLICATIONS

This application is a national stage application of International Patent Application PCT/EP2019/079897, filed on Oct. 31, 2019, which claims priority to U.S. Provisional Patent Application No. 62/754,267, filed on Nov. 1, 2018, both of which are hereby incorporated by reference in their entireties.

The present invention relates to a seat provided with an auxiliary tray table. The invention is particularly advantageously, but not exclusively, applied to aircraft seats for economy classes. However, the invention could also be applied to airplane seats for business classes or to seats for other means of transport such as, for example, seats for trains or boats.

In a manner known per se, a tray table of an economy class aircraft seat is mounted on a seat back by means of a tray table structure. The tray table is movable between a stored position, in which the tray table is positioned against a rear face of the seat back, and a deployed position, in which the tray table extends in a substantially horizontal plane to allow a passenger to place objects on the upper face of the tray table.

However, such a tray table offers a reduced space to the passenger who wants to put down his/her personal effects, such as cell phone, glasses or the like, while leaving space for his/her meal tray or laptop. The passenger may be forced to put down his/her phone next to a cup filled with liquid, so that there is a risk of damage, or to use his/her knees for his/her things, which is not practical or comfortable.

The invention aims to effectively overcome these drawbacks by proposing an assembly, particularly for an aircraft, comprising:
 a seat back,
 a main tray table mounted on the seat back by means of a tray table structure, said main tray table being movable between a stored position, in which the tray table is positioned against a rear face of the seat back, and a deployed position,
 said assembly further comprising an auxiliary tray table mounted on the tray table structure by means of at least one auxiliary arm, said auxiliary tray table being movable between a raised position and a deployed position, in which the auxiliary tray table is vertically superimposed with respect to the main tray table.

The invention thus makes it possible, thanks to the presence of the auxiliary tray table, to offer additional storage space to the passenger, who can put their personal effects down on the auxiliary tray table, when the available space of the main tray table is occupied by a meal tray or a laptop. The auxiliary tray table according to the invention also has the advantage of being independent of the seat back, insofar as it is connected not directly to the seat back but to the tray table structure. As a result, the auxiliary tray table does not move, when the seat back is moved rearward into the inclined position.

According to one embodiment, the auxiliary tray table is disposed between the rear face of the seat back and the main tray table, when the auxiliary tray table is in the raised position and the main tray table is in the stored position.

According to one embodiment, the auxiliary tray table is rotatably mounted on the auxiliary arm via a pivot connection.

According to one embodiment, the auxiliary arm is rotatably mounted on the tray table structure via a pivot connection between a stored position and a deployed position, in which the auxiliary arm extends substantially in a vertical direction.

According to one embodiment, said assembly comprises an elastic member for forcing a rotation of the auxiliary arm from the stored position to the deployed position.

According to one embodiment, said assembly comprises a system for locking the auxiliary arm in the deployed position.

According to one embodiment, the locking system comprises a pin movable between an unlocked position, in which the pin is released from a groove in the auxiliary arm, and a locked position, in which the pin cooperates with the groove in the auxiliary arm.

According to one embodiment, the locking system comprises a cam capable of controlling a displacement of the pin from one position to another.

According to one embodiment, the auxiliary tray table has a hole to provide a cup holder function.

According to one embodiment, a mirror is arranged on the back of the auxiliary tray table.

The invention also relates to a seat comprising an assembly such as defined above.

The invention further relates to an aircraft comprising a seat such as defined above.

The present invention will be better understood and other features and advantages will become apparent on reading the following detailed description including embodiments, given as illustrative examples, with reference to the accompanying figures, given as non-limiting examples, which could be used to completely understand the present invention and the description of its implementation and which could eventually contribute to its definition, in which:

FIG. 1 is a perspective view of a main tray table and an auxiliary tray table according to the invention in the raised position;

FIG. 2 is a perspective view of a main tray table and an auxiliary tray table according to the invention in the deployed position;

FIG. 3 is an exploded perspective view of a locking mechanism of an arm carrying the auxiliary tray table according to the present invention;

FIG. 4 is a longitudinal sectional view of a locking mechanism of an arm carrying the auxiliary tray table according to the present invention;

FIGS. 5a to 5d are side views of a seat according to the invention as well as cross-sectional views of the locking mechanism during a deployment phase of the main tray table and the auxiliary tray table according to the invention.

It is to be noted that, in the figures, the structural and/or functional elements common to the different embodiments may have the same references. Thus, unless otherwise stated, such elements have identical structural, dimensional and material properties.

Such relative terms as "horizontal", "vertical", "above", "below" are understood by reference to the common sense according to a passenger on a seat of the aircraft cabin and having a set of tray tables according to the invention in front of him/her. Such expressions as "substantially vertical" or "substantially horizontal" mean that there may be an angular deviation of a few degrees, at most 10 degrees, from the direction in reference.

FIGS. 1 and 2 show a main tray table 10 intended to be mounted on a seat back 11 (cf. FIG. 5a) via a tray table structure 12. The main tray table 10 is movable between a stored position, in which the main tray table 10 is positioned against a rear face of the seat back 11 (cf. FIG. 5a), and a deployed position, in which the main tray table 10 extends in a substantially horizontal plane to allow a passenger to place objects down on the upper face of said main tray table 10, such as shown in FIGS. 1 and 2.

The tray table structure 12 includes at least one structural arm 13, specifically two structural arms, arranged on either side of the main tray table 10. A structural arm 13 has a first end rotatably mounted relative to the seat back 11 and a second end, on which a core 15 and a pin 16 are fixed, as seen in FIG. 3. The structural arm 13, the core 15, and the pin 16 forming the tray table structure 12 can be assembled by means of a fixing member 18, such as a screw or any other member suitable for the application.

The main tray table 10 is carried by at least one main arm 20, specifically two main arms, rotatably mounted relative to the tray table structure 12. The main tray table 10 may be mobile in translation relative to the main arm 20. This makes it possible to adapt a distance between the main tray table 10 and the passenger according to the size of the passenger.

An auxiliary tray table 21 is mounted on the tray table structure 12 by means of at least one auxiliary arm 22, specifically two auxiliary arms, arranged on either side of the auxiliary tray table 21. The auxiliary tray table 21 is movable between a raised position, in which the auxiliary tray table 21 is located substantially in an extension of the auxiliary arms 22, such as shown in FIG. 1, and a deployed position, in which the auxiliary tray table 21 is vertically superimposed relative to the main tray table 10, such as shown in FIG. 2.

"Vertically superimposed" means that there is at least one straight line D perpendicular to the geometric plane of extension P1 of the main tray table 10 in the extended position that passes through the geometric plane of extension P2 of the auxiliary tray table 21 in the deployed position.

The auxiliary tray table 21 then has an upper face substantially parallel to the upper face of the main tray table 10. In the deployed position, the auxiliary tray table 21 extends above the main tray table 10.

The auxiliary tray table 21 may include a hole 26 for ensuring a cup holder function. In addition, a mirror 29 may be disposed on the back of the auxiliary tray table 21, such as shown in FIG. 1.

When the passenger opens his/her main tray table 10, she/he finds the auxiliary tray table 21 that he can put into the deployed position. If the passenger does not want to use the auxiliary tray table 21, she/he can leave it in the raised position.

More specifically, as it can be seen in FIGS. 3 and 4, an auxiliary arm 22 is rotatably mounted on the tray table structure 12 via a pivot connection 23. In this purpose, one end of the auxiliary arm 22 has an opening 24, in which a cylindrical portion of the core 15 is inserted, thus forming an axis of rotation for the auxiliary arm 22.

The auxiliary arm 22 is rotatable relative to the tray table structure 12 between a stored position, in which the auxiliary arm 22 forms an angle greater than 10 degrees relative to a vertical direction, and an extended position, in which the auxiliary arm 22 extends substantially in a vertical direction.

The auxiliary tray table 21 is rotatably mounted relative to the auxiliary arm 22 via a pivot connection 27. For this purpose, the auxiliary tray table 21 is mounted on one end of the auxiliary arm 22 by means of a rotation ring 28 and a fixing member 30, thus forming an axis of rotation for the auxiliary tray table 21.

An elastic member 32 is connected firstly to the tray table structure 12, in particular to the core 15, and secondly to the auxiliary arm 22 in order to force a rotation of the auxiliary arm 22 from the stored position to the deployed position, in which the auxiliary arm 22 extends substantially in a vertical direction. The elastic member 32 is disposed inside a housing in the core 15, as shown in FIG. 4. Specifically, the elastic member 32 is a torsion spring. As a variant, the elastic member 32 may have the form of a circlip or any other elastic element suitable for the application.

As it can be seen in FIG. 3 as well as in FIGS. 5a to 5d, there is provided preferably a locking system 35 capable of locking the auxiliary arm 22 in a deployed position.

The locking system 35 comprises for this purpose a pin 36 movable between an unlocked position, in which the pin 36 is released from a groove 37 in the auxiliary arm 22, and a locked position, in which the pin 36 cooperates with the groove 37 in the auxiliary arm 22 in order to hold the auxiliary arm 22 in the deployed position.

A cam 39 is adapted to control a displacement of the pin 36 from one position to another. The cam 39 is connected in rotation with the main arm 20 of the main tray table 10.

Hereinafter, with reference to FIGS. 5a to 5d, it is described a phase of deployment of the assembly formed by the main tray table 10 and auxiliary tray table 21 carried by the tray table structure 12.

In FIG. 5a, the main tray table 10 is in the stored position and the auxiliary tray table 21 is in the raised position. The auxiliary tray table 21 is then placed between the rear face of the seat back 11 and the main tray table 10.

As shown in FIG. 5b, during the deployment of the assembly, the main tray table 10 moves away from the seat back 11 due to the rotation of the structural arm 13 relative to the seat back 11 via its lower end as well as the rotation of the main tray table 10 relative to the upper end of the structural arm 13. Further, the auxiliary arm 22 automatically moves into position due to the action of the tension spring 32.

As shown in FIG. 5c, the rotation of the main arm 20 together with the cam 39 relative to the tray table structure 12 causes the displacement of the pin 36 inside the groove 37 so as to lock the auxiliary arm 22 in the vertical position. The main tray table 10 is in the deployed position, while the auxiliary tray table 21 is moved in rotation, along the arrow F, relative to the auxiliary arm 22 so as to move from the raised position to the deployed position.

As shown in FIG. 5d, the main tray table 10 and the auxiliary tray table 21 are then both in the deployed position.

Inverse displacements enable to unlock the auxiliary arm 22 and to return the main tray table 10 and the auxiliary tray table 21 into the stored position and the raised position, respectively.

Of course the different features, variants and/or embodiments of the present invention may be combined with one another in various combinations, insofar as they are not mutually incompatible or exclusive.

Obviously, the invention is not limited to the embodiments described above and provided only as examples. It encompasses various modifications, alternative forms and other variants that may be envisaged by a skilled man in the context of the present invention, and particularly all combinations of different embodiments described above, which may be taken separately or in combination.

The invention claimed is:
1. An assembly, in particular for an airplane, comprising a seat back, a main tray table mounted on the seat back by means of a tray table structure, said main tray table being movable between a stored position, in which the tray table is positioned against a rear face of the seat back, and a deployed position, characterized in that said assembly further comprises an auxiliary tray table mounted on the tray table structure by means of at least one auxiliary arm, said auxiliary tray table being movable between a raised position and a deployed position, in which the auxiliary tray table is vertically superimposed with respect to the main tray table, wherein the auxiliary arm is rotatably mounted on the tray table structure via a pivot connection between a stored position and a deployed position, in which the auxiliary arm extends substantially in a vertical direction, wherein the assembly further comprises a locking system for locking the auxiliary arm in the deployed position, wherein the locking system comprises a pin movable between an unlocked position, in which the pin is released from a groove in the auxiliary arm and a locked position, in which the pin cooperates with the groove in the auxiliary arm.

2. The assembly according to claim 1, characterized in that the auxiliary tray table is arranged between the rear face of the seat back and the main tray table, when the auxiliary tray table is in a raised position and that the main tray table is in the stored position.

3. The assembly according to claim 1, characterized in that the auxiliary tray table is rotatably mounted on the auxiliary arm via a pivot connection.

4. The assembly according to claim 1, characterized in that the assembly further comprises an elastic member for forcing a rotation of the auxiliary arm from the stored position to the deployed position.

5. The assembly according to claim 1, characterized in that the locking system comprises a cam capable of controlling a movement of the pin from one position to another.

6. The assembly according to claim 1, characterized in that the auxiliary tray table comprises a hole for ensuring a cup holder function.

7. The assembly according to claim 1, characterized in that a mirror is arranged on the back of the auxiliary tray table.

8. A seat comprising an assembly as defined in claim 1.

9. An airplane comprising a seat as defined in claim 8.

* * * * *